United States Patent Office 3,251,375
Patented May 17, 1966

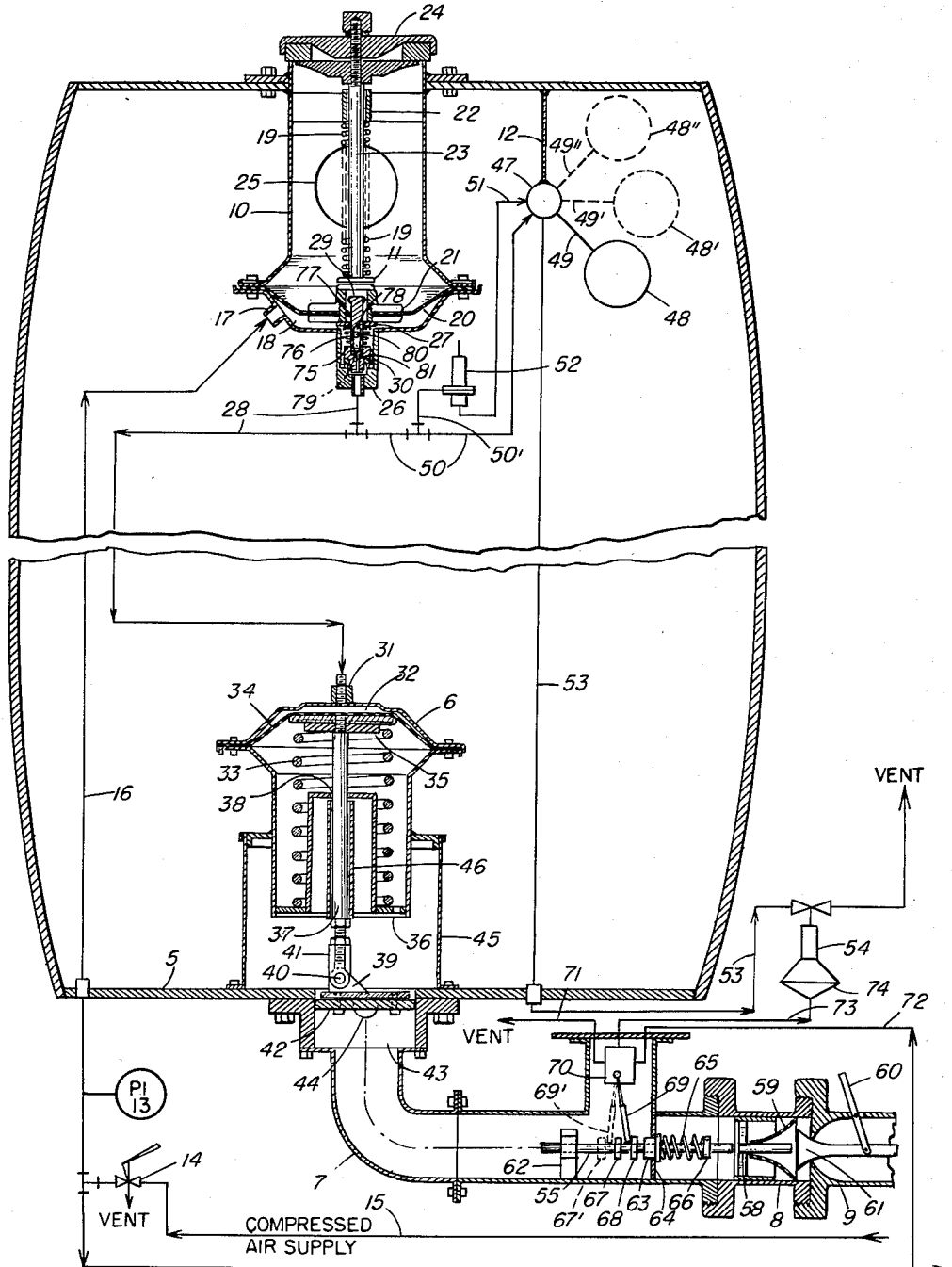

1

3,251,375
APPARATUS FOR BOTTOM LOADING AND
UNLOADING OF TANKS
Lionel E. Reed, Greenwich, and Othello M. Hillman, Stamford, Conn., assignors to Socony Mobil Oil Company, Inc., a corporation of New York
Filed July 17, 1963, Ser. No. 295,744
18 Claims. (Cl. 137—414)

This invention relates to novel apparatus adapted for use in bottom loading and unloading of liquid transport and storage tanks; more particularly, to novel apparatus adapted for such use and provided with automatic controls for greater safety in such liquid handling, as well as novel combinations of certain components of said apparatus.

The handling of liquid for purposes of storage and transport on a commercial scale has frequently presented difficult problems in terms of time, safety, and expense. In particular, in the loading and unloading of vessels for liquid transport or storage, there are situations in which time can be saved only by resort to liquid handling techniques which are prohibitively more expensive, or risk the safety of employees and equipment, or waste the liquids being handled. For example, in the handling of liquids which are inflammable, potentially explosive, toxic, highly corrosive, or the handling of liquids maintained at high temperatures or pressures or at very low temperatures, significant increases in liquid loading rates to effect economies in time often require large expenditures for additional safety equipment and personnel, and yet pose increased hazards for damage to property and personnel by inadvertent overflows or tank ruptures.

Potentially, such hazards are present in top loading of petroleum liquids when the loading is at high liquid flow rates which result in excessive vaporization and an accompanying static electricity hazard during such handling whereby bottom loading of tanks has appeared to offer significant advantages over top loading, particularly by being more compatible with higher liquid loading flow rates and accompanying time savings. However, high-rate bottom loading and unloading by heretofore used methods presents new and increased safety problems. For instance, in certain applications a connection separate from that for high-rate liquid loading and unloading is required for the escape from the tank of vapors displaced by the bottom-loaded liquids and for access to the tank of air to displace unloaded liquids, whereby the higher rates of bottom liquid loading are conducive to inadvertently overflowing the tank. Use, in such applications, of a bottom-loading liquid inlet valve subject to liquid source pressure fluctuations is conducive to surge, turbulence, evaporation loss, static electricity hazard, and the tendency for increase in the frequency of human errors in controlling the operation.

Accordingly, it is an object of the present invention to provide a novel apparatus adapted to provide greater safety and efficiency in bottom loading and unloading of liquid transport and storage tanks.

It is another object of this invention to provide a novel apparatus adapted to insure venting during liquid bottom loading and unloading of the tank.

It is still another object of this invention to provide a novel apparatus adapted to insure that high-rate tank loading can be automatically stopped before tank overflow or rupture conditions are reached.

It is a further object of this invention to provide a novel apparatus adapted for control of a liquid loading inlet valve independent of liquid source pressure fluctuations.

It is still another object of this invention to provide a

2 novel apparatus adapted to insure the automatic operation of the aforementioned objects throughout the liquid loading and unloading operations.

Still other objects of this invention and advantages derived therefrom will become apparent from the following discussion.

In one aspect, this invention relates to an apparatus that comprises a fluid storage compartment, conduit means to the lower portion of said compartment, a foot valve means normally biased to closed position controlling fluid flow between said compartment and said conduit means, a vent means in the upper portion of said compartment containing a vent valve means normally biased to closed position controlling fluid flow through said vent means, means to supply a control function to said vent valve means, means responsive to said control function to open said vent valve means and to supply said control function to said foot valve means, said foot valve means comprising a variable means responsive to said control function to open said foot valve means and to position same responsive to the magnitude of said control function, detection means to detect a condition within said compartment and which condition bears an ascertainable relationship to the fluid flow rate between said compartment and said conduit means, attenuating means responsive to said detection means to attenuate said control function to said foot valve means, and means to selectively actuate said attenuating means.

In another aspect, the invention includes a novel apparatus comprising a foot valve of specified structure disposed within a conduit adapted for passage of liquid therethrough and in which said foot valve comprises an enclosed housing, a diaphragm-containing means disposed within said housing to provide a gas-tight chamber, said diaphragm-containing means being responsive to the magnitude of the pressure within said chamber to increase the volume of said gas-tight chamber as the pressure therein is increased and to decrease the volume of said chamber as the pressure therein is decreased, a confined passage means connecting the interior of said chamber to a source of a fluid medium for control of the pressure in said chamber, a follower means responsive to the position of said diaphragm-containing means, and means, disposed in the line of fluid flow through said conduit, responsive to said follower means to completely obstruct fluid flow through said conduit when the pressure in said chamber is less than a predetermined amount and to decrease obstruction of fluid flow through said conduit as the pressure in said chamber is increased over said predetermined amount.

In still another aspect, the invention includes a novel vent valve means comprising a housing having an open end portion, a diaphragm-containing means disposed within said housing to provide a gas-tight chamber, said diaphragm-containing means being responsive to the magnitude of the pressure within said chamber to increase the volume of said gas-tight chamber as the pressure therein is increased and to decrease the volume of said chamber as the pressure therein is decreased, an opening in a wall surface of said housing defining said chamber adapted for passage into said chamber of a fluid medium for control of the pressure in said chamber, a follower means responsive to the position of said diaphragm-containing means, means responsive to said follower means to completely obstruct fluid flow through the open end portion of said housing when the pressure in said chamber is less than a first predetermined amount and to decrease obstruction of fluid flow through said open end portion of said housing as the pressure in said chamber is increased over said first predetermined amount, an opening in a wall surface of said housing other than in a wall surface defining said chamber adapted for passage of a fluid medium into a portion of said housing that is in open communication with the open end portion of said housing, a second opening in the wall surface of said housing defining said chamber, and means responsive to the pressure in said chamber to obstruct said second opening when the pressure in said chamber is below a second predetermined amount and to decrease obstruction of said second opening as the pressure in said chamber increases over said second predetermined amount.

In still another aspect, the invention includes a novel device to selectively actuate means for attenuating a control function to the foot valve, said device comprising an elongated member laterally disposed within an open end portion of a fluid conduit and substantially parallel to the fluid flow path through said conduit, resilient means that opposes longitudinal displacement of said elongated member in at least one direction away from its equilibrium position, means to simultaneously permit fluid flow through said open end portion of said conduit and longitudinally displace said elongated member from its equilibrium position by exerting sufficient force on said elongated member to overcome the opposing action of said resilient member, means to detect a condition which bears an ascertainable relationship to the fluid flow rate through said conduit, control means responsive to said detection means to control the fluid flow rate through said conduit, and actuating means responsive to the position of said elongated member to selectively actuate said control means.

In an embodiment of the invention with respect to use for bottom loading and unloading of a fluid storage compartment, the apparatus comprises a fluid storage compartment, conduit means into the lower portion of said compartment, a foot valve means normally biased to closed position controlling fluid flow between said compartment and said conduit means, a vent means in the upper portion of said compartment, a vent valve normally biased to closed position controlling fluid flow through said vent means, means to supply a control function to said vent valve, means responsive to said control function to open said vent valve and to supply said control function to said foot valve, variable means responsive to said control function to open said foot valve and to position same responsive to the magnitude of said control function, detection means to detect a condition within said compartment, which condition bears an ascertainable relationship to the fluid flow rate between said compartment and said conduit means, and attenuating means responsive to said detection means to attenuate said control function to said foot valve.

In another embodiment, the apparatus of this invention comprises a fluid storage compartment, conduit means into the lower portion of said compartment, a foot valve means normally biased to closed position controlling fluid flow between said compartment and said conduit means, a vent means in the upper portion of said compartment, a vent valve normally biased to closed position controlling fluid flow through said vent means, means to supply a control function to said vent valve, means responsive to said control function to open said vent valve and to supply said control function to said foot valve, variable means responsive to said control function to open said foot valve and to position same responsive to the magnitude of said control function, attenuating means to attenuate said control function to said foot valve, and means to selectively actuate said attenuating means.

In a further embodiment, the apparatus embodied herein comprises a fluid storage compartment, conduit means into the lower portion of said compartment, a foot valve means normally biased to closed position controlling fluid flow between said compartment and said conduit means, a vent means in the upper portion of said compartment, a vent valve normally biased to closed position controlling fluid flow through said vent means, means to supply a control function to said vent valve, means responsive to said control function to open said vent valve and to supply said control function to said foot valve, and variable means responsive to said control function to open said foot valve and to position same responsive to the magnitude of said control function.

In still another embodiment, the apparatus embodied herein comprises a fluid storage compartment, conduit means into the lower portion of said compartment, a foot valve means normally biased to closed position controlling fluid flow between said compartment and said conduit means, means to supply a control function to said foot valve, variable means responsive to said control function to open said foot valve and to position same responsive to the magnitude of said control function, detection means to detect a condition within said compartment, which condition bears an ascertainable relationship to the fluid flow rate between said compartment and said conduit means, attenuating means responsive to said detection means to attenuate said control function to said foot valve, and means to selectively actuate said attenuating means.

In a further embodiment, the apparatus of this invention comprises a fluid storage compartment, conduit means into the lower portion of said compartment, a foot valve means normally biased to closed position controlling fluid flow between said compartment and said conduit means, means to supply a control function to said foot valve, variable means responsive to said control function to open said foot valve and to position same responsive to the magnitude of said control function, detection means to detect a condition within said compartment, which condition bears an ascertainable relationship to the fluid flow rate between said compartment and said conduit means, and attenuating means responsive to said detection means to attenuate said control function to said foot valve.

In still another embodiment, the apparatus embodied herein comprises a fluid storage compartment, conduit means into the lower portion of said compartment, a foot valve means normally biased to closed position controlling fluid flow between said compartment and said conduit means, means to supply a control function to said foot valve, variable means responsive to said control function to open said foot valve and to position same responsive to the magnitude of said control function, attenuating means to attenuate said control function to said foot valve, and means to selectively actuate said attenuating means.

The invention can be understood more readily by reference to the diagrammatic drawing attached to and made a part of this disclosure, and the following detailed description. The attached drawing is a diagrammatic view of the novel liquid loading and unloading system of this invention, with novel apparatus included therein shown in vertical sections.

In general, there is shown in the drawing a tank 5 adapted to confine a liquid which is loaded into it from a tank manifold 7, and unloaded from it into the manifold 7. Disposed in the lower portion of the tank 5 and between the tank 5 and the manifold 7 to regulate the loading and unloading flows is a foot valve 6. A tank vent valve 10, disposed in the upper portion of the tank 5, is adapted to regulate the flow of fluids between the upper portion of the tank 5 and the atmosphere.

Also shown in the drawing is a compressed air control circuit comprising pipe 15, valve 14, and an air pressure indicator designated PI–13. The air circuit is supplied with compressed air from any suitable source such as, for example, an air brake system of a vehicle on which the tank 5 and an accompanying compressed air circuit can be mounted. The flow of compressed air from the compressed air source is regulated by the control circuit compressed air inlet valve 14 which can be manually controlled and which is disposed in the control circuit compressed air inlet pipe 15 from the compressed air source (not shown). By opening the compressed air inlet valve 14, compressed air is permitted to flow into pipe 16, in which is disposed pressure indicator PI–13 to provide a reading of the pressure in pipe 16, which can be observed by an operator manually controlling the setting of valve 14. Valve 14 can also be operated to vent pipe 16 to the atmosphere which may be desired when liquid is being neither loaded into nor unloaded from the tank 5, to eliminate the danger of an unintentional opening of the vent valve 10 or the foot valve 6 during such periods of time.

Via pipe 16, the compressed air passes through port 17 into chamber 18 of diaphragm valve 10 disposed in the upper wall portion of the tank 5 and normally biased to closed position by the force exerted by the spring 19. Compressed air in chamber 18 exerts a force on the diaphragm 20 and, if of a great enough pressure, causes it to move in opposition to the force exerted by spring 19 which is disposed in compression between the vent valve spring collar 22 which is stationary with respect to the housing of the valve 10, and the valve stem foot 11 which rests upon the diaphragm plate 21. Stem foot 11 is a part of stem 23 which extends substantially coaxially within the spring 19, from the vent valve cover plate 24 to which said valve stem 23 is rigidly attached, to its contact, via stem foot 11, with diaphragm plate 21 which is rigidly attached to diaphragm 20.

Plate 24 normally rests outside the tank 5 against the open end of the housing of vent valve 10 such that the interior of the said vent valve is sealed from the atmosphere. However, when compressed air is introduced into chamber 18, the pressure of such air can be increased until it exerts a force on diaphragm 20 sufficient to further compress spring 19 and, by means of a force transmitted from the diaphragm plate 21 through vent valve stem 23 to cover plate 24, displace the cover plate 24 away from the body of the vent valve 10.

Fluids within tank 5 have access to the interior of the body of the valve 10 by means of aperture 25 located in the portion of the housing of vent valve 10 situated within the tank 5. Thus the effect of displacing the cover plate 24 from the body of the valve 10 is to permit fluid flow between the atmosphere and the interior of the tank 5, via the interior of the body of the valve 10. It can thus be seen that an effect of increasing the air pressure within air chamber 18 until the vent valve spring 19 is compressed from its normal position in the vent valve 10, and thereby displacing the vent valve cover plate 24 away from the body of the vent valve 10, is to vent tank 5 to the atmosphere. Conversely, when air pressure within air chamber 18 is decreased until the force exerted thereby on the diaphragm 20 is insufficient to compress spring 19 from its normal position, an effect of such a decrease is to prevent fluid flow via valve 10 between the tank 5 and the atmosphere due to plate 24 obstructing the open end of valve 10.

Vent valve 10 as shown in the drawing is of a poppet type, i.e. when it is actuated by increasing the air pressure in air chamber 18 until the diaphragm plate 21, stem 23, and cover plate 24 are displaced from their rest positions, such displacement opens vent valve control air outlet port 26 to air chamber 18.

In the specific embodiment of the vent valve shown in the drawing, the passage of air from air chamber 18 to the vent valve control air outlet pipe 28 can also be regulated to occur only when the pressure in air chamber 18 exceeds by a predetermined amount the pressure required to displace cover plate 24 from the housing of vent valve 10 to vent, as described hereinbefore, tank 5 to the atmosphere. In the embodiment shown, a vent valve poppet spindle 29 with a flared head is coaxially and movably disposed within air outlet port 26, with one end affixed to a vent valve poppet spindle gasket ring 30 which, by coming into circular contact with the interior wall of the air outlet port 26, seals port 26 from air outlet pipe 28. The vent valve diaphragm plate ring 27, which is affixed to the underside of diaphragm plate 21, engages the flared head of spindle 29 after being displaced a predetermined distance away from air outlet port 26, and causes the spindle 29 to be displaced in conjunction with diaphragm 20, plate 21, and ring 27. This displacement of spindle 29 causes the unseating of gasket ring 30 and thereby permits the passage of air from outlet port 26 into air outlet pipe 28. Thus, the vent of this embodiment of the invention can be utilized to prevent control air from passing from air chamber 18 into air outlet pipe 28 until the pressure in air chamber 18 reaches a predetermined level or, of even greater significance in the present invention, until vent valve 10 has been substantially opened to vent tank 5 to the atmosphere.

Disposed between plate ring 27 and a circular shoulder 75 of spindle 29 is a conical spring 76 in slight compression when diaphragm 20 is in its rest position to insure a substantially constant clearance between plate ring 27 and the rim of air outlet port 26 and a gas-tight fit between gasket ring 30 and the interior wall of air outlet port 26. Disposed in spindle 29 is a ball bearing-type check valve 77 comprising a vertical elongated bore 78, a ball bearing 79 loosely disposed in bore 78, a first bore port 80 connecting bore 78 and air chamber 18 while plate ring 27 is clear of the rim of air outlet port 26, and a second bore port 81 connecting bore 78 and air outlet pipe 28. Ball bearing 79 can be displaced above the level of port 80 but not below the level of port 81, so that fluid can flow upward but not downward through check valve 77. This check valve insures that air pressure in air outlet pipe 28 greater than that in air chamber 18 will be rapidly relieved into air chamber 18, while pressures greater than that in air outlet pipe 28 will exist indefinitely in air chamber 18 without equalization, so long as spindle gasket ring 30 is in gas-tight contact with the interior wall of air outlet port 26.

From air outlet pipe 28, air passes via foot valve air inlet port 31 into foot valve air chamber 32. Foot valve 6 is a diaphragm valve of a butterfly type disposed in the lower wall portion of tank 5 and normally biased to closed position by the force of foot valve spring 33. Compressed air in air chamber 32 exerts force on foot valve diaphragm 34 and, if of a great enough pressure, can cause it to move in opposition to the force exerted by spring 33 compressibly disposed between foot valve diaphragm plate 35 rigidly attached to diaphragm 34, and foot valve spring plate 36 which is a rigid member of the housing of valve 6. Rigidly attached to and extending from diaphragm plate 35 is foot valve stem 37 coaxially disposed within spring 33 and through aperture 38 in the housing of valve 6, to lug 39. Stem 37 is affixed to lug 39 by coupling pin 40 which extends through foot valve stem jacket 41 rigidly affixed to the lower end portion of stem 37. Lug 39 is rigidly mounted on foot valve butterfly disk 42 disposed within an aperture 43 in tank 5. To port 43, disposed in the lower wall portion of tank 5, there is attached one end of the tank manifold 7 through which liquid can flow to or from port 43.

Butterfly disk 42 is a substantially flat plate, substantially the same shape and size as the aperture in port 43 in which it is disposed, and is adapted to fit tightly enough within said aperture, in one alternative position, to prevent the passage of liquids through said aperture. Butterfly disk 42 is disposed on and angularly displaceable about butterfly disk pin 44, the ends of which are rigidly secured with respect to the portion of port 43 which defines said aperture. Butterfly disk 42 is a substantially circular member, with disk pin 44 disposed to coincide with a diameter of disk 42.

In the drawing, foot valve 6 is shown in the closed position to which it is normally biased by the force of spring 33 which is compressed between spring plate 36 and diaphragm plate 35. However, when the pressure in air chamber 32 is increased until the force exerted on diaphragm 34 is more than sufficient to overcome the opposing force of spring 33, the resultant force is transmitted from diaphragm plate 35 to stem 37 and, via coupling pin 40, to lug 39 and the disk 42 attached thereto, initiating the angular displacement of disk 42 about an axis defined by disk pin 44. This angular displacement constitutes the opening of foot valve 6, which permits the flow of liquid between the manifold 7 and the tank 5, via port 43 and through screen 45. Further increases in the pressure in air chamber 32 have the effect of angularly displacing disk 42 progressively farther from its normal position until it is disposed, in a fully open position of foot valve 6, in a position substantially parallel to the longitudinal axis of stem 37 and to the direction of liquid flow through the aperture in port 43. Thus the control of pressure within air chamber 32 can be employed to control the extent of angular displacement of disk 42, and thereby the cross-sectional area available for liquid flow through the port 43.

While the pressure in air chamber 32 is below a predetermined amount insufficient to compress spring 33 from its normal position, disk 42 is prevented from angular displacement in the opposite direction, i.e., in a clockwise direction as viewed in the drawing, from the closed position of valve 6 by foot valve stem collar 46 which is rigidly disposed on stem 37 such that when disk 42 is positioned to fully obstruct the aperture in port 43, stem collar 46 bears against the underside of the portion of the housing of valve 6 defining aperture 38. Thus the reduction of pressure in air chamber 32 to any pressure less than the aforementioned predetermined amount has the effect of closing foot valve 6 and completely obstructing liquid flow between the tank 5 and the manifold 7.

Vent valve control air outlet pipe 28 is in open communication, via control air bleed pipe 50, with foot valve liquid flow controller 47 which, responsive to the liquid level in tank 5, can be used to automatically decrease or stop the flow of liquid between the manifold 7 and the tank 5 when liquid in tank 5 reaches predetermined levels corresponding to settings of flow controller 47.

In the drawing, flow controller 47 is shown as a compressed air valve suspended in the tank 5 by a support member 12 and mechanically responsive to a float-type liquid level detector which comprises a float ball 48 which floats upon the liquid within a range of relatively high tank liquids levels, and connected to controller 47 by float rod 49. The movement of float ball 48 from one to another of the float ball positions shown in the drawing as 48 and, in broken lines, 48′ and 48″, such as the movement which would be caused by a change from one to another of the tank liquid levels corresponding to such float ball positions causes a corresponding movement of the float rod 49 from one to another of the positions shown in the drawing as 49 and, in broken lines, 49′ and 49″, and thereby changes the position of valve 47.

Also connected to air valve 47 are a control air vent line 53, in which is disposed a control air vent valve 54, and an alternate control air bleed pipe 51 connected to a pressure control valve 52 disposed in air bleed pipe 50′ which is open to air bleed pipe 50.

In the position of valve 47 corresponding to tank liquid levels below that corresponding to the float ball positions shown at 48′ e.g. the float ball position shown at 48, air valve 47 is closed, preventing the escape of control air from air bleed pipes 50, 50′, and 51. With air valve 47 in this position, the compressed air is maintained in the system to control foot valve 6.

In the position of valve 47 corresponding to tank liquid levels at least as high as that corresponding to the float ball position shown at 48′ but below that corresponding to the float ball position shown at 48″, the air valve 47 is positioned to open alternate bleed pipe 51 to vent line 53, with bleed pipe 50 closed to prevent the escape of air therefrom. Provided vent valve 54 is open to the atmosphere, the magnitude of the pressure in bleed pipe 50–50′, and accordingly in air chamber 32, is then dependent on the setting of pressure control valve 52, which can be pre-set to maintain in bleed pipe 50–50′ and in air chamber 32 any desired pressure which can be supplied to the control air circuit through inlet valve 14. In a preferred embodiment of the invention, the pressure so maintained is of a magnitude which, acting on diaphragm 34 of foot valve 6, causes a deflection of foot valve spring 33 which corresponds to a desired partially open position of foot valve 6, effecting a partial obstruction of liquid flow between the manifold 7 and the tank 5.

In the position of air valve 47 corresponding to tank liquid levels at least as high as that corresponding to the float ball position shown at 48″, air valve 47 is positioned to open bleed pipe 50 to vent line 53. Provided vent valve 54 is open to the atmosphere, the pressure in bleed pipe 50–50′, and air chamber 32 is then reduced to substantially that of the atmosphere. With the pressure acting on diaphragm 34 of foot valve 6 thus reduced, foot valve 6 assumes the position to which it is normally biased by the force of spring 33, i.e. a fully closed position, effecting a complete obstruction of liquid flow between the manifold 7 and the tank 5.

Also shown in the drawing is a specific embodiment of means for selectively actuating the foot valve liquid flow controller 47 which comprises an air interlock shaft 55 disposed within and parallel to the longitudinal axis of the manifold 7. The open end of the manifold 7 is adapted to be engaged by one end of a liquid loading adapter 8, which is in turn adapted to be engaged at its other end by a liquid loading hydrant or, alternatively, a liquid loading nozzle 9, either of which is adapted for manual control over the flow of liquid being discharged therefrom.

Adapter 8 is connected to the open end portion of manifold 7 to provide a leak-proof connection. Inside of and substantially coaxial with adapter 8 is disposed an adapter shaft 58, displaceable along its longitudinal axis. Also disposed within adapter 8 is a check valve 59, through which liquid passing through adapter 8 flows, and which is disposed so that liquid is free to flow through adapter 8 toward the manifold 7 but not in the opposite direction.

Nozzle or hydrant 9 contains, as shown, a stopper 61 which can be manually displaced, e.g. by means of lever 60, in the direction of the intended liquid flow to permit the passage of liquid through the nozzle or hydrant 9. When fully displaced in the direction opposite the intended liquid flow direction, stopper 61 closes the nozzle or hydrant 9 so that no liquid can flow from it.

When it is desired to load liquid into the tank 5, nozzle or hydrant 9 is manually connected to the inlet end of adapter 8. After opening check valve 59, stopper 61 is manually displaced toward the manifold 7. As a result of such displacement, stopper 61 forcibly contacts adapter shaft 58 and displaces it toward the manifold 7. Adapter shaft 58, in the course of such displacement, forcibly contacts air interlock shaft 55, and displaces it along a longitudinal path in which it is laterally confined by an air interlock shaft support 62 and by an air interlock shaft slip ring 63 which is loosely and coaxially disposed about shaft 55 and maintained stationary with respect to the manifold 7 by the air interlock shaft slip ring spider support 64.

The displacement of shaft 55 is resiliently opposed by air interlock shaft spring 65 loosely and coaxially disposed about shaft 55 and which, to effect such displacement must be forcibly compressed between shaft slip ring 63, stationary with reference to the manifold 7, and the air interlock shaft spring collar 66, rigidly and coaxially mounted on shaft 55. The length of spring 65 in its equilibrium position is such that shaft 55 assumes substantially the position shown in the drawing when it is not inforcible contact with a member external to the manifold 7, such as adapter shaft 58.

Also rigidly mounted and spaced apart on shaft 55, between shaft support 62 and slip ring 63, are two air interlock shaft follower guide collars 67 and 68, between which is disposed one end portion of the air interlock shaft follower 69, shown in the drawing as a rigid shaft member. The other end portion of follower 69 is affixed to an air interlock valve 70, which is disposed in an enlarged portion of manifold 7, such that follower 69, depending on the position of shaft 55, will control valve 70.

Connected to valve 70 are a vent pipe 71 to the atmosphere, a compressed air inlet pipe 72 from control circuit air inlet valve 14, and a vent valve control air inlet pipe 73, through which compressed air is provided to control vent valve 54, which is a diaphragm valve normally biased to open position.

When shaft 55 is displaced by adapter shaft 58, as described hereinbefore, guide collar 68 is displaced to substantially the normal position of guide collar 67, which is simultaneously displaced to substantially the position shown in the drawing by broken lines as 67'. By this displacement of guide collars 67 and 68 to positions 67' and 67, respectively, the end portion of follower 69 disposed between them is displaced to the position shown in the drawing by broken lines as 69'.

In the position of valve 70 corresponding to guide collar positions 67 and 68 and follower position 69, valve 70 is positioned to provide open communication between pipe 73 (and thereby air chamber 74 of valve 54) and air inlet pipe 72. Provided the control circuit air inlet valve 14 is open, air chamber 74 of valve 54 is thereby pressurized and vent valve 54 caused to close, preventing the escape of control air from vent line 53, and thereby deactivating flow controller 47.

In the position of valve 70 corresponding to guide collar positions 67' and 67 and follower position 69', valve 70 is positioned to provide open communication between pipe 73 (and thereby air chamber 74 of valve 54) and vent pipe 71. The air chamber 74 of valve 54 is thereby vented and vent valve 54 allowed to open according to its normal bias, venting control air vent line 53 and thereby activating flow controller 47.

During periods of time when neither loading nor unloading of the tank is in progress, the control air circuit can be manually vented through an alternative setting of the air inlet valve 14, to avert the danger of an unintentional opening of vent valve 10, and particularly of foot valve 6. Provision can also be made for automatically venting the control air circuit during such periods, for example while a vehicle mounted tank is in motion, by connecting vent valve air inlet pipe 16 with the vehicle compressed air emergency brake line, so that when the vehicle emergency brake is released preparatory to vehicle movement, vent valve air inlet pipe 16 will be vented through the vehicle emergency brake compressed air lines.

The apparatus of this invention, as illustrated in a specific embodiment in the drawing, is operated in the following manner to load the storage tank.

If desired, vapor recovery equipment (not shown) can first be disposed to recover the vapors which may be vented through tank vent valve 10 during the loading operation. The operator then attaches an adapter 8 to the open end of the manifold 7. Nozzle 9 is next attached to adapter 8 and then opened by lever 60, displacing shaft 55 to open air vent valve 54 and permitting liquid to flow into the manifold 7. The operator next manually opens air inlet valve 14 to establish a predetermined air pressure, generally between 25 and 80 p.s.i.g., in the control circuit, thereby opening vent valve 10 and foot valve 6 and permitting liquid to flow into the tank 5.

As the liquid level approaches the lower setting of flow controller 47, air chamber 32 and pipes 28 and 50–50' are partially vented through pressure control valve 52 to reduce the pressure therein to a predetermined amount, thereby partially closing foot valve 6 and reducing the liquid loading flow rate.

As the tank liquid level reaches the upper setting of flow controller 47, air chamber 32 and pipes 28 and 50–50' are fully vented to reduce the pressure therein to atmospheric thereby completely closing the foot valve 6 and stopping the liquid loading flow.

The operator then vents pipe 16 to atmosphere by valve 14, and closes nozzle 9 by its lever 60, which permits shaft 55 to return to its equilibrium position. Air vent valve 54 remains open. Nozzle 9 is then disconnected from adapter 8, adapter 8 is removed from the manifold 7 and, if in use, the vapor recovery equipment is removed from its connection with tank vent valve 10.

With the system in this condition, the loading operation is complete. With a vehicle-mounted tank having pipe 16 connected to the vehicle air brake lines, release of the brake will serve as an additional check that the control air circuit is vented, to insure against the possibility of foot valve 6 opening during transport.

To unload liquid from the storage tank, as illustrated in a specific embodiment in the drawing, the following procedure is prescribed.

The operator attaches an unloading adapter (not shown) to the open end of manifold 7 and then attaches a liquid unloading nozzle (not shown) to the loading adapter. With a vehicle-mounted tank having pipe 16 connected to the vehicle brake lines, it will be necessary that the brake be applied at this juncture to seal the control air circuit from the atmosphere. The operator then opens valve 14 to establish a predetermined pressure, generally between 25 and 80 p.s.i.g., in the control circuit, which opens tank vent valve 10 and foot valve 6 and closes air vent valve 54 to deactivate flow controller 47 which would otherwise automatically, with a full or nearly full tank, fully or partially close foot valve 6. When as much liquid as desired has been unloaded, the operator closes the unloading nozzle and vents pipe 16 to atmosphere by inlet valve 14.

After the unloading nozzle is disconnected from the manifold 7, the unloading operation is complete. Release of the emergency brake, if the tank is vehicle-mounted and pipe 16 is connected to the vehicle brake lines, will provide an additional check that the control circuit is vented to insure further against an open foot valve condition during vehicle movement.

From the foregoing detailed description and operating procedure of a preferred embodiment of the system of this invention, the following advantages can be appreciated.

Since vent valve 10 can be operated, in the manner described hereinbefore, to prevent control air from passing from air chamber 18 into the pipe 28, from which it can pass into air chamber 32, until vent valve 10 has opened to vent the tank 5 to the atmosphere, and foot valve 6 remains closed so long as pressure in air chamber 32 is insufficient to cause the compression of spring 33, a system comprising vent valve 10, foot valve 6, and an interconnecting control circuit, can be operated to prevent the flow of liquid between the manifold 7 and the tank 5 through foot valve 6 unless the tank 5 is vented to the atmosphere through vent valve 10 prior to and during such liquid flow. This aspect of the invention has obvious utility and advantages as a safety device which can be operated to insure that pressurized liquids cannot be loaded into the tank without automatic protection against the build-up of excessive and dangerous pressures inside the tank.

Another desirable feature provided by this invention is an automatic reduction in a high-rate liquid flow into the tank when the liquid level begins to approach the top of the tank, to avoid inadvertently overpressuring the tank or causing an overflow of liquid. Automatic stoppage of pressurized liquid flow into the tank when the liquid level approximates the highest safe liquid level has similar desirability for purposes of avoiding inadvertent unsafe tank pressures or the spilling of liquids in relation to automatic liquid flow slowdowns. Automatic loading control provides the additional advantage of facilitating accurate measurements of the quantities of liquid loaded into the tank.

Furthermore, it can be seen that, with the apparatus of this invention, a physical step necessarily accompanying normal liquid loading of the tank, viz. operating liquid loading hydrant or nozzle 9 to permit the liquid to flow therefrom into the manifold, automatically insures that air vent valve 54 will be open during the loading operation, thus activating flow controller 47 described hereinabove, and thereby providing the loading operation with an automatic liquid loading shutoff device and, if additionally desired preliminary to shutoff, an automatic liquid loading slowdown device. It will also be seen in accordance with this aspect of the invention that a normal condition of the apparatus of the invention during normal tank unloading, i.e. having no hydrant or nozzle 9 connected to adapter 8, can suffice to automatically insure that air vent valve 54 will be closed, thus deactivating flow controller 47, and thereby permitting high rates of unloading from a full or nearly full tank.

From the foregoing detailed description of the invention and the attached drawing, it will be apparent that the invention is not limited to the specific embodiment referred to in the description and the drawing but that substitutions can be made for many elements of the novel combination apparatus shown therein.

For example, although the control circuit shown in the drawing utilizes compressed air as the control medium, the invention is not limited thereto, and may comprise instead any type of control circuit, e.g. a liquid hydraulic circuit or an electrical circuit, which is suitable to perform the control functions of the invention.

It should be appreciated that for purposes of the system of this invention, it is not necessary that the foot valve or vent valve be diaphragm valves sensitive to the pressure of compressed air, but that either or both the foot valve and vent valve can be of a type responsive to a different type of control function means, e.g. an electrical, electronic, mechanical or other fluid-mechanical control function means, or to a different type of control fluid, e.g. a liquid hydraulic fluid or a gas other than air.

It will also be apparent that for use in the apparatus of this invention, neither the foot valve nor the vent valve need have their respective resilient means disposed, as shown in the drawing, outside their respective air chambers to be compressed by the expansion of said air chambers, but either or both the foot valve and vent valve can have their respective resilient means disposed within their respective air chambers and put in increased tension by the expansion of said air chambers.

It should further by appreciated in regard to the foot valve and vent valve that for use in the apparatus of this invention, neither need exercise control over fluid flow in the respective manners illustrated in the drawing, but that the foot valve can exercise such control by other suitable means, e.g. by the mechanism of a gate valve or slide valve, and the vent valve can exercise such control by other suitable means, e.g. by the mechanism of a butterfly valve, slide valve, or gate valve.

With reference to the specific embodiments of the aspect of this invention relating to a foot valve of the butterfly type described hereinbefore, it will be appreciated that the butterfly disk 42 therein need not be circular in shape but can be eliptical, square, or any of many other shapes suitable to perform the function of substantially completely closing the aperture in port 43 while maintaining a desired position with respect thereto; that the butterfly disk pin 44 can be disposed alternatively along any straight line within or apurtenant to the butterfly disk 42; that the coupling pin 40 can be rotatably disposed at any of many locations in relation to the butterfly disk 42 not in a plane defined by the axis of the foot valve stem 37 and the butterfly disk pin 44, i.e. in any suitable location whereby the force exerted by the foot valve stem 37, as it is longitudinally downwardly displaced along the straight line path in which it is laterally confined by the aperture 38 in the body of the foot valve 6, and its connection with the foot valve diaphragm plate 35, is not directed toward the line within the butterfly disk 42 in which the butterfly disk pin 44 is disposed. It should further be appreciated that although the foot valve is shown in the drawing disposed upon the floor of a flat-bottom tank, the foot valve of this invention can alternatively be disposed in another suitable relationship to the tank, e.g. in the bottom of a tank having sides which slope inwardly toward the foot valve, or in a sump which extends below the main portion of the tank and which is in open communication therewith.

Although the foot valve liquid flow controller 47 is described in reference to the drawing as a compressed air valve responsive to a float-type liquid level detector 48, and which flow controller 47 can be a three-position air valve, it will be appreciated that, for use in this invention with a control circuit of a type other than one utilizing compressed air, e.g. an electrical or electronic circuit, the foot valve liquid flow controller 47 can be any other type of controller, e.g. a multiply-poled electric switch or any other type of mechanical, hydraulic or electric controller, which is compatible with such other type of control circuit. It will also be apparent that it is not necessary to the present invention that the foot valve liquid flow controller 47 be responsive to a float-type liquid level detector, or to any type of liquid level detector. Alternatively, the foot valve liquid flow controller 47 of the present invention can be responsive to any other suitable type of liquid level detector, e.g. a bi-reed electromagnetic or other mechanical, electrical, or hydraulic type, or to any other suitable type of detector sensitive to any other condition which exists in the tank 5, which condition bears an ascertainable relationship to the liquid flow rate between the tank 5 and the manifold 7. Non-limiting examples of such conditions are internal tank pressure, the temperature, density, total weight, or acidity or alkalinity of the liquid in the tank, concentrations of a selected component in the liquid in the tank, or rates of change of any of the foregoing conditions, and any suitable mechanical, electrical, hydraulic, magnetic, electromagnetic, electrochemical, or other type of means sensitive to one or more of such conditions and compatible with the type of foot valve liquid flow controller being used can be employed singly or in combination to provide foot valve liquid flow control means for use in the present invention.

For use in the apparatus of this invention, the foot valve liquid flow controller may, but need not have multiple settings in order to exercise different controls, e.g. slow-down or full stoppage, over the foot valve liquid flow between the tank 5 and the manifold 7. It can be of a type which can be set to exercise a continuous variable control over the foot valve liquid flow rate, responsive to continuous detection of one or more of the conditions of the type described hereinbefore.

Although described hereinbefore mainly with reference to tank loading, it will be appreciated that a foot valve liquid controller such as any of the types mentioned hereinbefore can readily be used in connection with tank unloading as well. For such an alternative use, the relation between the condition which exists in the tank 5 and changes therein which bear an ascertainable relationship to the foot valve liquid flow rate and the control exercised over the foot valve by the controller will generally have to be merely reversed. For example, using a controller responsive to the liquid level during unloading of the tank, a float-type level detector can be disposed so as to be sensitive to liquid levels beginning to approach a liquid outlet disposed in the lower portion of the tank, and a foot valve flow controller, responsive to such a detector, provided for reducing the liquid unloading flow rate when such low liquid levels are reached, to avoid severe liquid vortexing in the tank, which can cause air to be withdrawn with the liquid being unloaded, and thereby result in faulty metering of the liquid unloaded.

For use in the apparatus of this invention, the means to selectively actuate the control function attenuating means is not limited to the specific embodiment illustrated in the drawing, but may vary in many ways within the scope of the function it is employed to perform. For example, the resilient means therein can alternatively be a spring which is placed in tension during displacement of the air interlock shaft from its equilibrium position, or electromagnetic or other suitable means for resiliently maintaining said shaft in an equilibrium position. The means for selectively actuating the control function attenuating means can be adapted to be actuated by displacement in the direction opposite the intended liquid loading flow, for use with a liquid loading hydrant or nozzle having a poppet device which is retracted during liquid loading.

Rather than the mechanical air interlock shaft follower means 69 and follower guide means 67–68 shown in the drawing, there can alternatively be employed in the present invention any other suitable means by which the displacement of the air interlock shaft from its equilibrium position can be sensed, e.g. hydraulic, electrical, electronic, or electromagnetic means.

In the specific embodiment of the novel apparatus for selectively actuating a control function means employing air interlock shaft collars, slip ring, spider supports, and spring such as those shown in the drawing, the arrangement of such elements on the air interlock shaft is not limited to that shown therein, but can be in any form adapted for performing the desired actuating function.

Also with reference to said control function actuating means, such means can be used in combination with, or as novel apparatus inclusive of, any suitable detection means of the types hereinbefore described, rather than being limited to use in combination with or inclusive of the tank liquid level detection means illustrated in the specific embodiment shown in the drawing. Likewise, such use can, within the scope of the present invention, be in conjunction with any suitable control function means of the types hereinbefore described, and is not limited to use in combination with or inclusive of the compressed air control circuit shown in the specific embodiment of the drawing. Furthermore, it will be appreciated that the valve means 70 responsive to the follower means 69 can be a two-position air valve, but can be any other suitable means for selectively actuating a control function means responsive to said follower means, e.g. a multiply-poled electric switch or other electric means or an electronic, electromagnetic, or other mechanical means compatible with the follower means and control function means employed.

It will be appreciated from the foregoing examples that although the apparatus of the present invention has been described in some aspects with preferred embodiments, resort to modifications and variations can be had without departing from the spirit and scope of the invention, as those skilled in the art will readily understand. Such variations and modifications are therefore considered to be within the purview and scope of the appended claims.

We claim:

1. An apparatus adapted for the storage of a fluid which comprises a fluid storage compartment, conduit means to the lower portion of said compartment, a foot valve means normally biased to closed position controlling fluid flow between said compartment and said conduit means, a vent means in the upper portion of said compartment containing a vent valve means normally biased to closed position controlling fluid flow through said vent means, means to supply a control function to said vent valve means, means responsive to said control function to open said vent valve means, means responsive to an open position of said vent valve means to supply said control function to said foot valve means, said foot valve means comprising a variable means responsive to said control function to open said foot valve means and to position same responsive to the magnitude of said control function, detection means to detect a condition within said compartment and which condition bears an ascertainable relationship to the fluid flow rate between said compartment and said conduit means, attenuating means responsive to said detection means to attenuate said control function to said foot valve means, and means to selectively actuate said attenuating means.

2. An apparatus, as defined in claim 1, in which said control function is the pressure of a confined fluid medium and in which said vent means comprises a housing having an open end portion, a diaphragm-containing means disposed within said housing to provide a gas-tight chamber, said diaphragm being responsive to the magnitude of the pressure within said chamber to increase the volume of said chamber as the pressure therein is increased and to decrease the volume of said chamber as the pressure therein is decreased, an opening in a wall surface of said housing defining said chamber through which said confined fluid medium is supplied to said chamber for control of the pressure in said chamber, means responsive to the position of said diaphragm to completely obstruct fluid flow through the open end portion of said housing when the pressure in said chamber is less than a first predetermined amount and to decrease obstruction of fluid flow through said open end portion of said housing as the pressure in said chamber is increased over said first predetermined amount, an opening in a wall surface of said housing other than in a wall surface defining said chamber adapted for passage of a fluid medium from said compartment into a portion of said housing that is in open communication with the open end portion of said housing, a second opening in the wall surface of said housing defining said chamber through which said confined fluid medium is supplied to said foot valve means, and means responsive to the pressure in said chamber to obstruct said second opening when the pressure in said chamber is below a second predetermined amount and to decrease obstruction of said second opening as the pressure in said chamber increases over said second predetermined amount.

3. An apparatus, as defined in claim 1, in which said detection means comprises a liquid level detector.

4. An apparatus, as defined in claim 1, in which said control function is the pressure of a confined fluid medium, and in which said attenuating means comprises a pressure control valve that controls the pressure of said confined fluid medium supplied to said foot valve means.

5. An apparatus, as defined in claim 1, in which said means to selectively actuate said attenuating means comprises an elongated member laterally disposed within an open end portion of said conduit means and substantially parallel to the fluid flow path through said conduit means, resilient means that opposes longitudinal displacement of said elongated member in at least one direction away from its equilibrium position, means to permit fluid flow through said open end portion of said conduit means and longitudinally displace said elongated member from its equilibrium position by exerting sufficient force on said elongated member to overcome the opposing action of said resilient member, and actuating means responsive to the position of said elongated member to selectively actuate said attenuating means.

6. An apparatus, as defined in claim 1, in which said control function is the pressure of a confined fluid medium, in which said foot valve means comprises a diaphragm-containing means that provides a gas-tight chamber, said diaphragm being responsive to the magnitude of the pressure within said chamber to increase the volume of said gas-tight chamber as the pressure therein is increased and to decrease the volume of said chamber as the pressure therein is decreased, and flow-obstruction means responsive to the position of said diaphragm, in which said means to supply said control function to said foot valve means comprises means to supply said confined fluid medium to said gas-tight chamber, and in which said foot valve means is disposed within said compartment in such a position that said flow-obstruction means completely obstructs fluid flow between said compartment and said conduit means when the pressure in said chamber is less than a predetermined amount and decreases obstruction of fluid flow between said compartment and said conduit means as the pressure in said chamber is increased over said predetermined amount.

7. An apparatus adapted for storage of a fluid which comprises a fluid storage compartment, conduit means to the lower portion of said compartment, a foot valve means normally biased to closed position controlling fluid flow between said compartment and said conduit means, a vent means in the upper portion of said compartment containing a vent valve normally biased to closed position controlling fluid flow through said vent means, means to supply a control function to said vent valve, means responsive to said control function to open said vent valve, means responsive to an open position of said vent valve to supply said control function to said foot valve, said foot valve means containing variable means responsive to said control function to open said foot valve and to position same responsive to the magnitude of said control function, detection means to detect a condition within said compartment which condition bears an ascertainable relationship to the fluid flow rate between said compartment and said conduit means, and attenuating means responsive to said detection means to attenuate said control function to said foot valve.

8. An apparatus, as defined in claim 7, in which said control function is the pressure of a confined fluid medium and in which said vent means comprises a housing having an open end portion, a diaphragm-containing means disposed within said housing to provide a gas-tight vent valve chamber, said diaphragm being responsive to the magnitude of the pressure within said chamber to increase its volume as the pressure therein is increased and to decrease the volume of said chamber as the pressure therein is decreased, an opening in a wall surface of said housing defining said chamber through which said confined fluid medium is supplied to said chamber for control of the pressure in said chamber, means responsive to the position of said diaphragm to completely obstruct fluid flow through the open end portion of said housing when the pressure in said chamber is less than a first predetermined amount and to decrease obstruction of fluid flow through said open end portion of said housing as the pressure in said chamber is increased over said first predetermined amount, an opening in a wall surface of said housing other than in a wall surface defining said chamber adapted for passage of a fluid medium from said compartment into a portion of said housing that is in open communication with the open end portion of said housing, a second opening in the wall surface of said housing defining said chamber through which said confined fluid medium is supplied to said foot valve means, and means responsive to the pressure in said chamber to obstruct said second opening when the pressure in said chamber is below a second predetermined amount and to decrease obstruction of said second opening as the pressure in said chamber increases over said second predetermined amount.

9. An apparatus, as defined in claim 7, in which said control function is the pressure of a confined fluid medium, in which said foot valve means comprises a diaphragm-containing means that provides a gas-tight chamber, said diaphragm being responsive to the magnitude of the pressure within said chamber to increase the volume of said gas-tight chamber as the pressure therein is increased and to decrease the volume of said chamber as the pressure therein is decreased, and flow-obstruction means responsive to the position of said diaphragm, in which said means to supply said control function to said foot valve means comprises means to supply said confined fluid medium to said gas-tight chamber, and in which said foot valve means is disposed within said compartment in such a position that said flow-obstruction means completely obstructs fluid flow between said compartment and said conduit means when the pressure in said chamber is less than a predetermined amount and decreases obstruction of fluid flow between said compartment and said conduit means as the pressure in said chamber is increased over said predetermined amount.

10. An apparatus for storage of a fluid which comprises a fluid storage compartment, a conduit means into the lower portion of said compartment, a foot valve means normally biased to closed position controlling fluid flow between said compartment and said conduit means, a vent means in the upper portion of said compartment containing a vent valve normally biased to closed position controlling fluid flow through said vent means, means to supply a control function to said vent valve, means responsive to said control function to open said vent valve, means responsive to an open position of said vent valve to supply said control function to said foot valve, variable means responsive to said control function to open said foot valve and to position same responsive to the magnitude of said control function, attenuating means to attenuate said control function to said foot valve, and means to selectively actuate said attenuating means.

11. An apparatus, as defined in claim 10, in which said control function is the pressure of a confined fluid medium and in which said vent means comprises a housing having an open end portion, a diaphragm-containing means disposed within said housing to provide a gas-tight chamber, said diaphragm being responsive to the magnitude of the pressure within said chamber to increase its volume as the pressure therein is increased and to decrease the volume of said chamber as the pressure therein is decreased, an opening in a wall surface of said housing defining said chamber through which said confined fluid medium is supplied to said chamber for control of the pressure in said chamber, means responsive to the position of said diaphragm to completely obstruct fluid flow through the open end portion of said housing when the pressure in said chamber is less than a first predetermined amount and to decrease obstruction of fluid flow through said open end portion of said housing as the pressure in said chamber is increased over said first predetermined amount, an opening in a wall surface of said housing other than in a wall surface defining said chamber adapted for passage of a fluid medium from said compartment into a portion of said housing that is in open communication with the open end portion of said housing, a second opening in the wall surface of said housing defining said chamber through which said confined fluid medium is supplied to said foot valve means, and means responsive to the pressure in said chamber to obstruct said second opening when the pressure in said chamber is below a second predetermined amount and to decrease obstruction of said second opening as the pressure in said chamber increases over said second predetermined amount.

12. An apparatus, as defined in claim 10, in which said control function is the pressure of a confined fluid medium, in which said foot valve means comprises a diaphragm-containing means that provides a gas-tight chamber, said diaphragm being responsive to the magnitude of the pressure within said chamber to increase the volume of said gas-tight chamber as the pressure therein is increased and to decrease the volume of said chamber as the pressure therein is decreased, and flow-obstruction means responsive to the position of said diaphragm, in which said means to supply said control function to said foot valve means comprises means to supply said confined fluid medium to said gas-tight chamber, and in which said foot valve means is disposed within said compartment in such a position that said flow-obstruction means completely obstructs fluid flow between said compartment and said conduit means when the pressure in said chamber is less than a predetermined amount and decreases obstruction of fluid flow between said compartment and said conduit means as the pressure in said chamber is increased over said predetermined amount.

13. An apparatus, as defined in claim 10, in which said means to selectively actuate said attenuating means comprises an elongated member laterally disposed within an open end portion of said conduit means and substantially parallel to the fluid flow path through said conduit means, resilient means that opposes longitudinal displacement of said elongated member in at least one direction away from its equilibrium position, means to permit fluid flow through said open end portion of said conduit means and longitudinally displace said elongated member from its equilibrium position by exerting sufficient force on said elongated member to overcome the opposing action of said resilient member, and actuating means responsive to the position of said elongated member to selectively actuate said attenuating means.

14. An apparatus adapted for storage of a fluid which comprises a fluid storage compartment, conduit means into the lower portion of said compartment, a foot valve means normally biased to closed position controlling fluid flow between said compartment and said conduit means, a vent means in the upper portion of said compartment containing a vent valve normally biased to closed position controlling fluid flow through said vent means, means to supply a control function to said vent valve, means responsive to said control function to open said vent valve, means responsive to an open position of said vent valve to supply said control function to said foot valve, and variable means responsive to said control function to open said foot valve and to position same responsive to the magnitude of said control function.

15. An apparatus, as defined in claim 14, in which said control function is the pressure of a confined fluid medium and in which said vent means comprises a housing having an open end portion, a diaphragm-containing means disposed within said housing to provide a gas-tight chamber, said diaphragm being responsive to the magnitude of the pressure within said chamber to increase its volume as the pressure therein is increased and to decrease the volume of said chamber as the pressure therein is decreased, an opening in a wall surface of said housing defining said chamber through which said confined fluid medium is supplied to said chamber for control of the pressure in said chamber, means responsive to the position of said diaphragm, to completely obstruct fluid flow through the open end portion of said housing when the pressure in said chamber is less than a first predetermined amount and to decrease obstruction of fluid flow through said open end portion of said housing as the pressure in said chamber is increased over said first predetermined amount, an opening in a wall surface of said housing other than in a wall surface defining said chamber adapted for passage of a fluid medium from said compartment into a portion of said housing that is in open communication with the open end portion of said housing, a second opening in the wall surface of said housing defining said chamber through which said confined fluid medium is supplied to said foot valve means, and means responsive to the pressure in said chamber to obstruct said second opening when the pressure in said chamber is below a second predetermined amount and to decrease obstruction of said second opening as the pressure in said chamber increases over said second predetermined amount.

16. An apparatus, as defined in claim 14, in which said control function is the pressure of a confined fluid medium, in which said foot valve means comprises a diaphragm-containing means that provides a gas-tight chamber, said diaphragm being responsive to the magnitude of the pressure within said chamber to increase the volume of said gas-tight chamber as the pressure therein is increased and to decrease the volume of said chamber as the pressure therein is decreased, and flow-obstruction means responsive to the position of said diaphragm, in which said means to supply said control function to said foot valve means comprises means to supply said confined fluid medium to said gas-tight chamber, and in which said foot valve means is disposed within said compartment in such a position that said flow-obstruction means completely obstructs fluid flow between said compartment and said conduit means when the pressure in said chamber is less than a predetermined amount and decreases obstruction of fluid flow between said compartment and said conduit means as the pressure in said chamber is increased over said predetermined amount.

17. An apparatus adapted for control of fluid flow and to provide a signal representing that said fluid flow is unobstructed, comprising a housing having an open end portion, a diaphragm-containing means disposed within said housing to provide a gas-tight chamber, said diaphragm being responsive to the magnitude of the pressure within said chamber to increase the volume of said gas-tight chamber as the pressure therein is increased and to decrease the volume of said chamber as the pressure therein is decreased, an opening in a wall surface of said housing defining said chamber adapted for passage into said chamber of a first fluid medium for control of the pressure in said chamber, means responsive to the position of said diaphragm to completely obstruct fluid flow through the open end portion of said housing when the pressure in said chamber is less than a predetermined amount and to decrease obstruction of fluid flow through said open end portion of said housing as the pressure in said chamber is increased over said predetermined amount, an opening in a wall surface of said housing other than in a wall surface defining said chamber adapted for passage of a second fluid medium into a portion of said housing that is in open communication with the open end portion of said housing, a second opening in the wall surface of said housing defining said chamber, and means responsive to the pressure in said chamber to obstruct said second opening when the pressure in said chamber is less than said predetermined amount and to decrease obstruction of said second opening as the pressure in said chamber increases over said predetermined amount.

18. An apparatus, as defined in claim 17, which further comprises a resilient means that opposes said diaphragm against movement which would increase the volume of said chamber as the pressure therein is increased.

References Cited by the Examiner

UNITED STATES PATENTS

| | | | |
|---|---|---|---|
| 494,984 | 4/1893 | Edmonds | 137—595 X |
| 1,435,921 | 11/1922 | Grossenbacher | 137—595 |
| 2,849,019 | 8/1958 | Oliveau et al. | 137—414 X |
| 2,884,964 | 5/1959 | Tye | 141—128 |
| 3,029,833 | 4/1962 | De Frees | 137—414 |

FOREIGN PATENTS 652,825  11/1962  Canada.

ISADOR WEIL, *Primary Examiner.*

WILLIAM F. O'DEA, *Examiner.*

D. MATTHEWS, *Assistant Examiner.*